United States Patent Office 3,560,565
Patented Feb. 2, 1971

3,560,565
1-AMINO-N-SULFONYLCYCLOPENTANE-CARBOXAMIDES
Scott J. Childress, Philadelphia, and J Lester Szabo, West Chester, Pa., assignors to American Home Products Corporation, New York, N.Y.
No Drawing. Filed June 3, 1969, Ser. No. 830,154
Int. Cl. C07c *143/74, 143/78*
U.S. Cl. 260—556                                    5 Claims

ABSTRACT OF THE DISCLOSURE

This invention concerns 1-amino-N-sulfonylcyclopentane-carboxamides which are pharmacologically active as immunosuppressive agents and are substantially non-irritating to the gastrointestinal tract upon oral administration.

---

The present invention relates to new and novel sulfonamides. In particular, it concerns 1-amino-N - sulfonylcyclopentanecarboxamides which in standard and accepted biological procedures have demonstrated immunosuppressive activity. Further, these compounds are substantially nonirritating to the gastrointestinal tract of animals upon oral ingestion.

The new and novel compounds within the scope of the present invention are represented by the following formula:

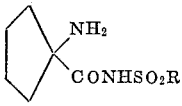

wherein R is selected from lower alkyl, phenyl, halophenyl, loweralkylphenyl and lower alkoxyphenyl. As employed herein the terms "lower alkyl," "lower alkoxy" and the like are meant to include both straight and branched chain hydrocarbon groups containing from one to about seven carbon atoms. Typical examples thereof are: 1-amino - N - methylsulfonylcyclopentanecarboxamide; 1 - amino - N - ethylsulfonylcyclopentane-carboxamide; 1 - amino - N-(p-tosyl)cyclopentanecarboxamide; 1 - amino - N - (p-methoxyphenyl)sulfonylcyclopentanecarboxamide; 1 - amino - N - phenylsulfonylcyclopentanecarboxamide; and 1 - amino - N-(m-chlorophenyl)cyclopentanecarboxamide.

The new and novel compounds of the present invention are prepared by the process illustrated by the following reaction scheme:

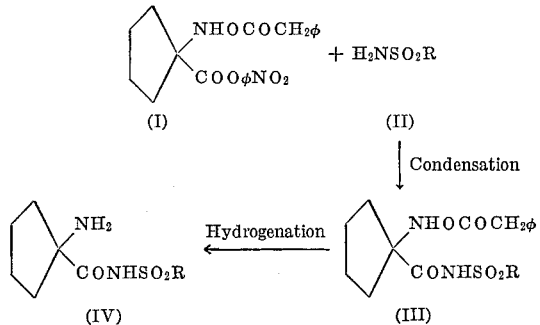

wherein R is defined as above. The condensation reaction is effected by contacting a 1-carbobenzoxamido - 1-cyclopentanecarboxylic acid, p-nitrophenyl ester (I) with an appropriate sulfonamide (II), in the presence of benzyldimethylamine, at a temperature of about 120° C. for a period of about three hours. When the condensation reaction is complete, the resulting 1-carbobenzoxamido-N - sulfonylcyclopentanecarboxamide (III) is separated by routine procedures. For example, the reaction mixture is dissolved in methylene chloride, washed with an aqueous alkaline solution, e.g. sodium bicarbonate, extracted with methylene chloride, precipitated by the addition of an ether, filtered and then dried.

The hydrogenation reaction is effected by contacting an above-prepared 1 - carbobenzoxamido - N - sulfonylcyclopentanecarboxamide (III) with hydrogen gas in the presence of about 10% palladium on charcoal. When the reaction is complete, the resulting 1-amino - N - sulfonylcyclopentanecarboxamide (IV) is isolated by standard recovery methods. For example, the reaction mixture is filtered, the filtrate evaporated to dryness and then recrystallized from a suitable solvent, e.g. ethanol to afford the hydrogenation product (IV).

The 1 - carbobenzoxamido - 1-cyclopentanecarboxylic acid, p-nitrophenyl esters (I) employed as starting materials in the above-described process are prepared by reacting 1-amino-cyclopentanecarboxylic acid with carbobenzoxy chloride in the presence of dilute alkali under Schotten-Baumnn reaction conditions. The 1-amino - 1-cyclopentanecarboxylic acid precursor compound is prepared by the following procedure:

1-amino - cyclopentanecarboxylic acid is prepared by admixing 154 gms. of cyclopetanone, 342 gms. of ammonium carbonate monohydrate, and one liter of 60 percent v./v. aqueous ethanol. The suspension is heated to 55° C. and 100 gms. of potassium cyanide dissolved in 250 ml. of water are added over a period of one hour. The mixture is held at 55–60° C. for two hours and then heated to 90° C. until the ethanol and ammonium carbonate are removed. The solution is cooled, 100 ml. of water added, and brought to pH 3 with hydrochloric acid, using ventilation. The precipitated hydantoin (M.P. 216–217° C.) is filtered off, washed with water and dried. One mole (154 gms.) of this hydantoin is refluxed for seventy-two hours under nitrogen with 450 gms. of 60 percent w./w. sulfuric acid. The solution is cooled and neutralized to pH 5 with solid sodium hydroxide. The mixture is cooled to 0° C., filtered, and the solid washed with cold water. The solid is dissolved in two liters of warm water at pH 2, treated with activated charcoal, adjusted to pH 5, cooled to 0° C., and the solid is then filtered, washed with cold water, and dried.

The sulfonamides (II) which are employed as starting materials in the above process are either commercially available or are easily prepared by procedures well known in the chemical art. Although the above-described condensation reaction has been conducted by fusing an admixture of the reactants, it is readily apparent that this reaction could be conducted in an appropriate solvent, e.g. methylene chloride. Many such solvents will readily suggest themselves to one skilled in the art of chemistry.

The new and novel 1-amino-N-sulfonylcyclopentanecarboxamides (IV) of the present invention are useful immuno-suppressive agents. In particclar, in standard and accepted pharmacological tests these compounds have been found to be useful to suppress an antibody response and to minimize reactions to certain antibodies, in conditions, such as, experimentally-induced allergic encephalomyelitis paralysis, an immunoinflammatory disease. The compounds of this invention are tested in rats and guinea pigs by the procedures described by Bradriss, M. W., in Science 140, 186, 1963 and Levine et al. in Proc. Soc. 114, 220, 1963. In these tests the compounds of this invention demonstrate immunosuppressive activity when administered parenterally at dosage ranges from about 50 to about 150 mg./kilo of body weight. Further, when administered orally, immunosuppressive activity is effected at a dosage range of about 100 to 600 mg./kilo of body weight.

A particular useful property of the 1-amino-N-sulfonyl-cyclopentanecarboxamides (IV) of the present invention, is that, these sulfonamide derivatives have surprisingly retained the immunosuppressive activity of their corresponding 1-amino-1-cyclopentanecarboxylic acids, as described in copending U.S. patent application, Ser. No. 591,782, filed by Norman H. Grant and Marvin E. Rosenthale on Nov. 3, 1966, while unlike said acids in standard biological tests they have demonstrated themselves to be substantially non-irritating to the gastrointestinal tract of animals when orally administered.

When the 1-amino-N-sulfonylcyclopentanecarboxamides (IV) of the present invention are used orally as immunosuppressive agents which are not irritating to the gastrointestinal tract, they may be administered to warm-blooded animals, e.g. mice, rats, rabbits, dogs, cats, monkeys, etc. alone or in combination with pharmacologically acceptable carriers, the proportion of which is determined by the solubility and chemical nature of the compound, chosen route of administration and standard biological practice. For example, they may be administered orally in the solid form containing such excipients as starch, milk sugar, certain types of clay and so forth. They may also be administered orally in the form of solutions or they may be injected parenterally.

The dosage of the present immunosuppressive agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples are given by way of illustration:

EXAMPLE I

A mixture of 7.7 g. of 1-carbobenzoxamido-1-cyclopentanecarboxylic acid, p-nitrophenyl ester, 1.95 g. methanesulfonamide and 2.7 g. benzyldimethylamine is gradually heated. Heating is continued at 120° C. for three hours. On cooling, the resulting light brown syrup is dissolved in methylene chloride. The resulting solution is washed three times with an aqueous sodium bicarbonate solution. The separated aqueous bicarbonate solution is acidified and extracted with methylene chloride. The organic layer is dried, evaporated and dissolved in a small amount of methylene chloride from which a solid is obtained by the addition of petroleum ether. The solid is dissolved in methylene chloride, petroleum ether is added to cloudiness and the cloudiness is removed by warming. On standing, 1-carbobenzoxamido-N-methylsulfonylcyclopentanecarboxamide gradually crystallizes as a white solid (1.2 g., 18% yield), M.P. 159–160° C.

A solution of 3.7 g. of the above prepared intermediate in 200 ml. of absolute alcohol is hydrogenated in the presence of 10% palladium on charcoal. Thereafter, the catalyst is filtered off, washed first with alcohol and then water. The filtrate is evaporated to dryness in vacuo, yielding a nearly white solid. The solid is dissolved in boiling 95% ethanol, allowed to cool and then diluted with ether to afford a precipitate which is collected by filtration to afford 1-amino-N-methylsulfonylcyclopentanecarboxamide (1.77 g.), M.P. 259° C. (decomp.).

*Analysis.*—Calc'd for $C_7H_{14}N_2SO_3$ (percent): C, 40.8; H, 6.85; N, 13.59. Found (percent): C, 40.49; H, 6.65; N, 13.52.

Similarly, when the above reaction is repeated substituting p-toluenesulfonamide for methanesulfonamide, there is obtained 1-amino-N-(p-tosyl)cyclopentanecarboxamide.

EXAMPLE II

A mixture of 15.8 g. 1-carbobenzoxamide-1-cyclopentanecarboxylic acid. p-nitrophenyl ester, 4.0 g. ethanesulfonamide and 5.5 g. benzyldimethylamine is gradually heated to 120° C. The mixture is maintained at this temperature for three hours. On cooling methylene chloride is added to dissolve the mass. The resulting solution is washed three times with an aqueous sodium bicarbonate solution. The separated aqueous bicarbonate solution is acidified and extracted with methylene chloride. The organic layer is dried, evaporated, and taken up in a small amount of methylene chloride from which a solid is obtained by the addition of petroleum ether. The solid is again dissolved in methylene chloride, then petroleum ether is added thereto until a cloudiness forms and the cloudiness is removed by warming. On standing a solid crystallizes which is collected by filtration to afford 1-carbobenzoxamido-N-ethylsulfonylcyclopentanecarboxamide.

A solution of 7.5 g. of the above intermediate in 400 ml. of absolute alcohol is hydrogenated in the presence of 10% palladium on charcoal. Thereafter, the catalyst is filtered off, washed first with alcohol and then water. The filtrate is evaporated to dryness in vacuo, yielding a solid. The solid is dissolved in boiling 95% ethanol, allowed to cool and then diluted with ether to afford a solid which is filtered a yield 1-amino-N-ethylsulfonylcyclopentanecarboxamide.

EXAMPLE III

When the procedure of Examples I and II is repeated to react 1-carbobenzoxamido-1-cyclopentanecarboxylic acid, p-nitrophenyl ester with an appropriate sulfonamide, the corresponding 1-carbobenzoxamido-N-sulfonylcyclopentanecarboxamide is obtained which is then hydrogenated to afford the following compounds:

1-amino-N-butylsulfonylcyclopentanecarboxamide;
1-amino-N-(m-tosyl)cyclopentanecarboxamide;
1-amino-N-(p-iodophenylsulfonyl)cyclopentanecarboxamide;
1-amino-N-propylsulfonylcyclopentanecarboxamide;
1-amino-N-phenylsulfonylcyclopentanecarboxamide;
1-amino-N-isobutylsulfonylcyclopentanecarboxamide;
1-amino-N-(p-ethylphenylsulfonyl)cyclopentanecarboxamide;
1-amino-N-(m-chlorophenylsulfonyl)cyclopentanecarboxamide;
1-amino-N-(p-fluorophenylsulfonyl)cyclopentanecarboxamide;
1-amino-N-(p-methoxyphenylsulfonyl)cyclopentanecarboxamide;
1-amino-N-(m-ethoxyphenylsulfonyl)cyclopentanecarboxamide;
1-amino-N-(p-propoxyphenylsulfonyl)cyclopentanecarboxamide; and
1-amino-N-(p-bromophenylsulfonyl)cyclopentanecarboxamide.

What is claimed is:
1. A compound selected from the group having the formula:

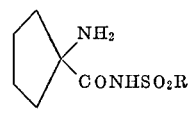

wherein R is selected from lower alkyl, phenyl, halophenyl, lower alkylphenyl and lower alkoxyphenyl.

2. A compound as described in claim 1 which is: 1-amino-N-methylsulfonylcyclopentanecarboxamide.

3. A compound as described in claim 1 which is: 1-amino-N-ethylsulfonylcyclopentanecarboxamide.

4. A compound as described in claim 1 which is: 1-amino-N-(p-tosyl)cyclopentanecarboxamide.

5. A compound as described in claim 1 which is: 1-amino-N-phenylsulfonylcyclopentanecarboxamide.

FOREIGN PATENTS 620,778   3/1949   Great Britain _____ 260—556

HENRY R. JILES, Primary Examiner

S. D. WINTERS, Assistant Examiner

U.S. Cl. X.R.

424—321; 260—468